United States Patent
Channer et al.

(10) Patent No.: US 10,977,670 B2
(45) Date of Patent: Apr. 13, 2021

(54) METHOD AND SYSTEM FOR DETERMINING AND MONITORING BRAND PERFORMANCE BASED ON PAID EXPENDITURES

(71) Applicant: Mass Minority Inc., Toronto (CA)

(72) Inventors: Brett William Mathew Channer, Clarksberg (Town of Blue Mountains) (CA); Esme Rottschafer, Toronto (CA); Jeremy Grant Chrystman, Toronto (CA); Wee Khang Teo, Scarborough (CA); John Liam Sproule Tengelis, Owen Sound (CA)

(73) Assignee: MASS MINORITY INC., Toronto (CA)

( * ) Notice: Subject to any disclaimer, the term of this patent is extended or adjusted under 35 U.S.C. 154(b) by 137 days.

(21) Appl. No.: 16/252,043

(22) Filed: Jan. 18, 2019

(65) Prior Publication Data
US 2019/0228422 A1    Jul. 25, 2019

Related U.S. Application Data

(60) Provisional application No. 62/620,800, filed on Jan. 23, 2018.

(51) Int. Cl.
*G06Q 30/02* (2012.01)
*G06F 16/9536* (2019.01)
*G06Q 10/06* (2012.01)

(52) U.S. Cl.
CPC ..... *G06Q 30/0201* (2013.01); *G06F 16/9536* (2019.01); *G06Q 10/0637* (2013.01); *G06Q 10/06393* (2013.01); *G06Q 30/0204* (2013.01)

(58) Field of Classification Search
CPC ............ G06F 1/00–40/00; G06Q 10/00–50/00
(Continued)

(56) References Cited

U.S. PATENT DOCUMENTS

| 7,904,327 B2 | 3/2011 | Phelan et al. |
| 7,974,983 B2 | 7/2011 | Goeldi |

(Continued)

FOREIGN PATENT DOCUMENTS

| CA | 2833453A1 A1 | 5/2014 |
| WO | WO 2016/122532 A1 | 8/2016 |
| WO | WO2018/112651 A1 | 6/2018 |

OTHER PUBLICATIONS

Srivastava, Rajesh Kumar. "Measuring brand strategy: can brand equity and brand score be a tool to measure the effectiveness of strategy?." Journal of Strategic Marketing 17.6 (2009): 487-497. (Year: 2009).*

(Continued)

*Primary Examiner* — Alan S Miller
(74) *Attorney, Agent, or Firm* — Gordon & Jacobson, P.C.

(57) ABSTRACT

An interactive algorithm and sequential methodology dynamically that pulls numerous organic data sets from online social, search, sentiment and paid media sources against a weighted formulation to determine with statistical significance a brand's market performance and characterization defined as a "Brand Attraction Score" in real time against key competitors. Consumer and media behaviors are measured using billions of data signals from multiple API sources distributed downstream through a series of influence (I) and exposure (E) weighted formulations to a master algorithm to determine the net performance and attraction scores and ranking. These statistical sets are then conformed into a series of scores and rankings in a predetermined competitive set in an Exposure to Attraction coordinate system, thereby allowing a Brand to easily visualize their comparative Attraction among their competitor brands.

25 Claims, 8 Drawing Sheets

(58) Field of Classification Search
USPC .............................................. 705/7.11–7.42
See application file for complete search history.

(56) References Cited

U.S. PATENT DOCUMENTS

| | | | |
|---|---|---|---|
| 8,055,548 B2 | 11/2011 | Staib et al. | |
| 8,468,045 B2* | 6/2013 | Cavander | G06Q 30/0244 |
| | | | 705/7.31 |
| 8,548,844 B2* | 10/2013 | Steelberg | G06Q 30/02 |
| | | | 705/7.32 |
| 8,751,479 B2* | 6/2014 | Steelberg | G06Q 30/02 |
| | | | 707/709 |
| 9,129,021 B2* | 9/2015 | Steelberg | G06Q 30/02 |
| 10,007,927 B2 | 6/2018 | Koran et al. | |
| 10,102,535 B2 | 10/2018 | Penumaka et al. | |
| 10,325,272 B2* | 6/2019 | Hunt | G06Q 30/0201 |
| 10,387,894 B2* | 8/2019 | Akkiraju | G06Q 30/0251 |
| 2003/0126146 A1* | 7/2003 | Van Der Riet | G06Q 30/0255 |
| 2003/0187719 A1 | 10/2003 | Brocklebank | |
| 2004/0093296 A1* | 5/2004 | Phelan | G06Q 30/02 |
| | | | 705/36 R |
| 2005/0209909 A1 | 9/2005 | Dull et al. | |
| 2006/0041562 A1* | 2/2006 | Paczkowski | G06F 16/9562 |
| 2006/0085255 A1* | 4/2006 | Hastings | G06Q 30/02 |
| | | | 705/14.4 |
| 2007/0067297 A1* | 3/2007 | Kublickis | G06Q 20/29 |
| 2007/0198510 A1 | 8/2007 | Ebanks | |
| 2008/0319829 A1* | 12/2008 | Hunt | G06Q 30/0201 |
| | | | 705/7.29 |
| 2009/0006156 A1* | 1/2009 | Hunt | G06Q 30/02 |
| | | | 705/7.11 |
| 2009/0018996 A1* | 1/2009 | Hunt | G06F 16/2264 |
| 2010/0138279 A1* | 6/2010 | Cohen | G06Q 10/0639 |
| | | | 705/7.38 |
| 2010/0299226 A1* | 11/2010 | Steelberg | G06Q 30/02 |
| | | | 705/27.1 |
| 2010/0312769 A1 | 12/2010 | Bailey et al. | |
| 2011/0029391 A1* | 2/2011 | Steelberg | G06Q 30/0276 |
| | | | 705/14.72 |
| 2011/0040606 A1* | 2/2011 | Steelberg | G06Q 30/0254 |
| | | | 705/14.4 |
| 2011/0040648 A1* | 2/2011 | Steelberg | G06Q 30/02 |
| | | | 705/26.3 |
| 2011/0258560 A1 | 10/2011 | Mercuri et al. | |
| 2012/0158476 A1 | 6/2012 | Neystadt et al. | |
| 2012/0290446 A1* | 11/2012 | England | G06Q 30/0282 |
| | | | 705/27.1 |
| 2014/0200968 A1 | 7/2014 | Yoder et al. | |
| 2015/0134404 A1 | 5/2015 | Gustafson et al. | |
| 2015/0149373 A1* | 5/2015 | Chhaya | G06Q 30/0282 |
| | | | 705/319 |
| 2016/0042366 A1 | 2/2016 | Lux et al. | |
| 2016/0132904 A1* | 5/2016 | Mondal | G06Q 30/0201 |
| | | | 705/7.29 |
| 2020/0090196 A1* | 3/2020 | de Saint Leger | G06Q 30/0201 |

OTHER PUBLICATIONS

"Towards Automated Reputation and Brand Monitoring on the Web", Ziegler, et al., Conference Paper—Dec. 2006, DOI: 10.1109/WI.2006.177—Source: DBLP.
International Search Report and Written Opinion dated Jan. 8, 2019 of Application No. PCT/CA2019/000006.

* cited by examiner

CATEGORY: BEVERAGES

| INFLUENCE METRICS | WEIGHTED BY | TRAFFIC SOURCES BY CATEGORY | WEIGHTING BY CATEGORY |
|---|---|---|---|
| I1 (SEARCH) | ORGANIC SEARCH | 24.13% | 25.78% |
| I2 (KEYWORD) | ORGANIC SEARCH | 24.13% | 25.78% |
| I3 (WEB) | DIRECT / REFERRALS | 42.20% | 45.10% |
| I4 (SENTIMENT) | SOCIAL | 3.13% | 3.34% |
| | | 93.58% | 100.00% |

CATEGORY: SHOPPING > CLOTHING

| INFLUENCE METRICS | WEIGHTED BY | TRAFFIC SOURCES BY CATEGORY | WEIGHTING BY CATEGORY |
|---|---|---|---|
| I1 (SEARCH) | ORGANIC SEARCH | 13.96% | 16.53% |
| I2 (KEYWORD) | ORGANIC SEARCH | 13.96% | 16.53% |
| I3 (WEB) | DIRECT / REFERRALS | 51.28% | 60.76% |
| I4 (SENTIMENT) | SOCIAL | 5.21% | 6.17% |
| | | 84.40% | 100.00% |

CATEGORY: FOOD AND DRINK

| INFLUENCE METRICS | WEIGHTED BY | TRAFFIC SOURCES BY CATEGORY | WEIGHTING BY CATEGORY |
|---|---|---|---|
| I1 (SEARCH) | ORGANIC SEARCH | 28.54% | 29.76% |
| I2 (KEYWORD) | ORGANIC SEARCH | 28.54% | 29.76% |
| I3 (WEB) | DIRECT / REFERRALS | 34.64% | 36.13% |
| I4 (SENTIMENT) | SOCIAL | 4.16% | 4.34% |
| | | 95.87% | 100.00% |

CATEGORY: LAW AND GOVERNMENT

| INFLUENCE METRICS | WEIGHTED BY | TRAFFIC SOURCES BY CATEGORY | WEIGHTING BY CATEGORY |
|---|---|---|---|
| I1 (SEARCH) | ORGANIC SEARCH | 21.46% | 22.52% |
| I2 (KEYWORD) | ORGANIC SEARCH | 21.46% | 22.52% |
| I3 (WEB) | DIRECT / REFERRALS | 50.26% | 52.75% |
| I4 (SENTIMENT) | SOCIAL | 2.10% | 2.20% |
| | | 95.28% | 100.00% |

FIG.2

AUTO - CANADA BPM: OCT 2017 - NOV 2018

| RANK | BRAND | EXPOSURE METRICS | | INFLUENCE METRICS | | | | MASS ATTRACTION SCORE |
|---|---|---|---|---|---|---|---|---|
| | | EXPOSURE | APPEAL NET SENTIMENT | INTEREST SEARCH 25% | PRESENCE KEYWORD 25% | RELEVANCE CONTENT 47% | ADVOCACY ENGAGEMENT 3% | INFLUENCE SCORE 100% |
| 1 | BRAND A | | | | | | | | 79 |
| 2 | BRAND B | | | | | | | | 70 |
| 3 | BRAND C | | | | | | | | 65 |
| 4 | BRAND D | | | | | | | | 62 |
| 5 | BRAND E | | | | | | | | 59 |
| 6 | BRAND F | | | | | | | | 58 |
| 8 | BRAND G | | | | | | | | 55 |
| 7 | BRAND H | | | | | | | | 55 |
| 9 | BRAND I | | | | | | | | 54 |
| 10 | BRAND J | | | | | | | | 52 |
| 13 | BRAND K | | | | | | | | 49 |
| 11 | BRAND L | | | | | | | | 49 |
| 12 | BRAND M | | | | | | | | 48 |
| 15 | BRAND N | | | | | | | | 46 |
| 16 | BRAND O | | | | | | | | 45 |
| 14 | BRAND P | | | | | | | | 44 |
| 17 | BRAND Q | | | | | | | | 43 |
| 18 | BRAND R | | | | | | | | 43 |
| 19 | BRAND S | | | | | | | | 40 |
| 22 | BRAND T | | | | | | | | 35 |
| 20 | BRAND U | | | | | | | | 34 |
| 21 | BRAND V | | | | | | | | 33 |
| 23 | BRAND W | | | | | | | | 31 |
| 24 | BRAND X | | | | | | | | 18 |

| | HOW PEOPLE FEEL ABOUT YOUR BRAND | ARE YOU WINNING OR LOSING SEO BATTLE IN CATEGORY | STRENGTH OF YOUR BRAND'S SEARCH POSITIONING TO DEFEND AGAINST COMPETITORS | RELEVANCE OF YOUR BRAND'S CONTENT HUB TO ATTRACT CONSUMERS | ARE PEOPLE ORGANICALLY ENGAGING AND SHARING ABOUT YOUR BRAND |

FIG. 4

METHOD AND SYSTEM FOR DETERMINING AND MONITORING BRAND PERFORMANCE BASED ON PAID EXPENDITURES

The invention relates in general to monitoring brand performance, and specifically to methods and systems for determining and monitoring brand performance and a brand's mass attraction score using real time statistically significant scoring and ranking of a brand's market performance against category competitors.

BACKGROUND

Conventional methods for monitoring brand performance, or a brand's market behavior are not only data source centric, but are also based on economic centric factors. For example, conventional online marketing monitoring systems focus on factors such as, number of ads bought, number of clicks per view, number of conversions, and the like, from a particular source provider over a multitude of real time data points. They also fail to offer the brand owner the opportunity to factor in the brand owner's investment or expenditure to assist in determining the return on the brand owner's investment in a brand. Accordingly, the brand owner is required to determine/monitor performance separately for each data source/service provider, and independently determine/monitor brand owner's return on investment in a brand.

Accordingly, the inventors have recognized a need for a holistic performance view of a brand's market behavior and/or investment, and methods of incorporating not only economic factors, but brand performance and investment/expenditure factors as well.

SUMMARY

The invention solves the problems with conventional methods by providing a holistic view on a brand's market performance against key competitors. As a result, a brand owner can make more informed marketing decisions in assessing brand performance, and a brand's mass attraction score from a single significant source of data and analytics, and may factor into that holistic view of brand owner investment/expenditure factors when determining or assessing the brand owner's return on investment in a brand.

An advantage of the invention is that it allows marketers to understand their brand's total digital influence and mass media paid market performance in a single scoring and ranking so they can make more informed decisions on their marketing investments.

Further scope of applicability of the invention will become apparent from the detailed description given hereinafter. However, it should be understood that the detailed description and specific examples, while indicating exemplary embodiments of the invention, are given by way of illustration only, since various changes and modifications within the spirit and scope of the invention will become readily apparent to those skilled in the art.

BRIEF DESCRIPTION OF THE DRAWINGS

FIG. 2 illustrates influence factor weightings by category;
FIG. 4 illustrates an example Attraction score report for the financial management category.

DETAILED DESCRIPTION

Figure 1:
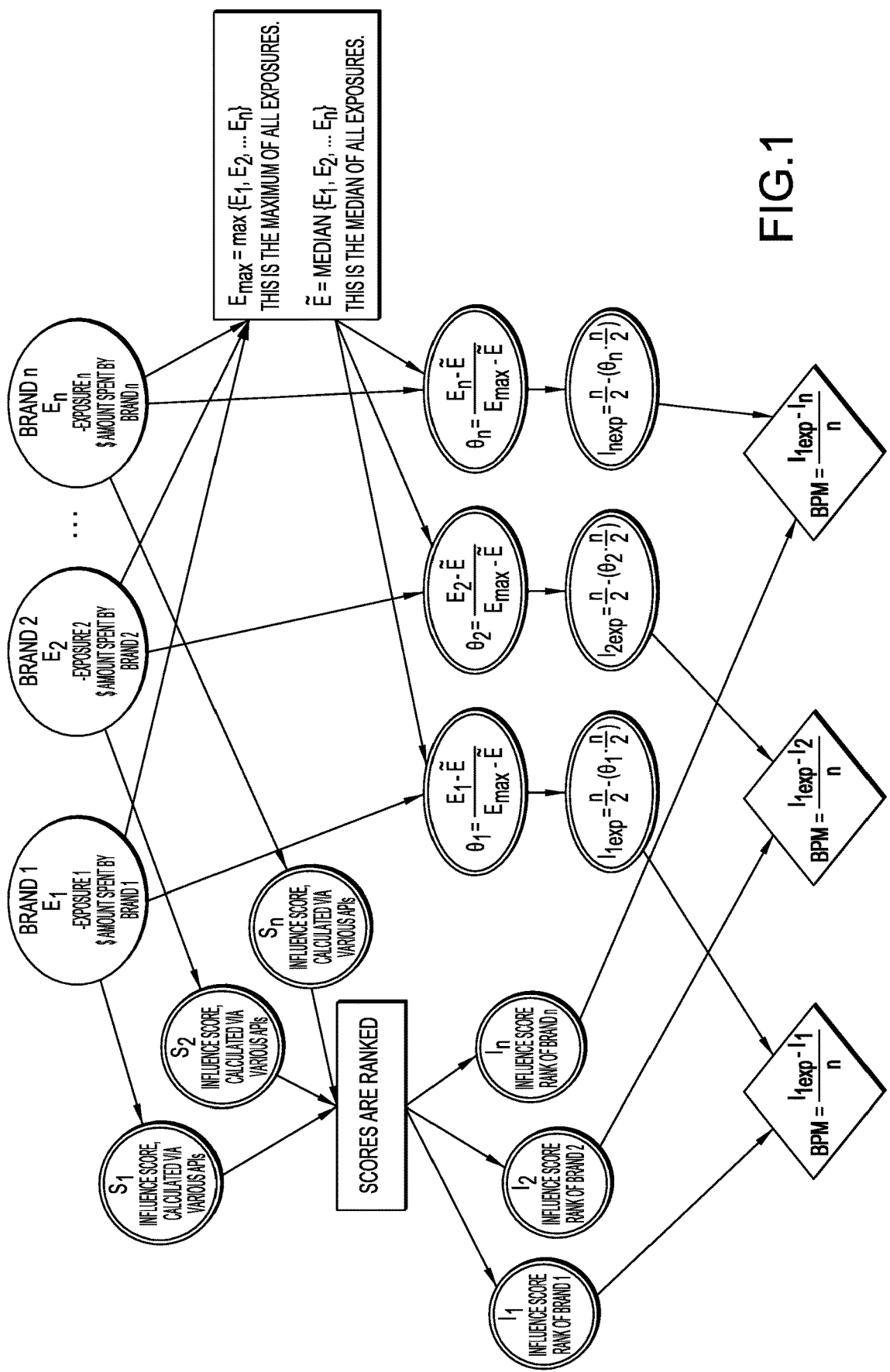
FIG. 1 is a flow diagram of an exemplary method.

The invention is directed to a system and method that dynamically pulls organic data sets from multiple online social, search, sentiment and paid media sources, then scores the data sets against a weighted formulation, and determines a brand's market performance in real time against key competitors.

For purposes of this disclosure Brand Performance is defined as the statistical significance of a brand's market performance against key competitors in real-time. This Brand Performance reflects the balance of influence and exposure working together to drive results. It is based on what people buy into, not just what they buy and is evidence of popularity—the state or condition of being liked, admired or supported by many people.

The Brand Attraction Monitor (BAM) is a weighted comparison of a brand's paid Exposure (E) versus a brand's Influence (I) for a set of competitor brands over time, and calculates one brand's Attraction Score ($A_{score}$) based on the competitive set of brands being compared within a brand category. The BAM models the conversion of paid exposure into influence for a competitive set of brands from which an overall Attraction Score is calculated, for example, out of 100. BAM results are presented as an Attraction Score on the BAM Matrix of Exposure (E) versus Influence (I) for a competitive set of brands for the specific date range. BAM results are calculated in real time: monthly, quarterly, and annually. The BAM applications include ongoing monitoring and optimization of the conversion of exposure into influence for a brand and for competitive intelligence, and planning purposes based on adjustments to BAM factors (competitive set, brand category weighting, exposure factors, net sentiment mentions, influence factors, online brand domains, brand keywords, geographic locations, dates) in a uniquely weighted system.

Consumer and media behaviors are measured using billions of data signals from multiple sources. The analytics data is extracted from multiple data sources using respective source APIs based on the specific parameters of the brand being monitored (Step 602). For purposes of this disclosure, the below exemplary input parameters are being utilized. However, additional and/or different parameters may be used as necessary for each source API.

Example Input Parameters
1. Domain_Name (e.g., the domain/web address for a brand)
2. Brand_Name (e.g., a company name or name given to a brand)
3. Brand_Category_Peers (set of competitor brand names for a defined category, may be defined as a custom list or query)
4. Country (e.g., United States)
5. Date_Range (e.g., dd/mm/yyyy-dd/mm/yyyy)
6. Offline_Discount (numeric value between 0 and 1)
7. Brand owner's advertising expenditure in the brand.

The input parameters define various constraints for extracting the analytics data for a particular brand from the various data sources. The analytics data is extracted in a series of influence data sources/channels across domains of brand health (e.g., Brand Interest, Presence, Relevance, and Advocacy), for example, search influence, keyword influence, web influence, and social influence. Each influence factor score is calculated based on data acquired using a separate API corresponding to each source type and then brought together, using the example formulations provided below, in the form of a total influence "I" score (Step 604 and 606). This total influence score is then plugged into a master BAM algorithm where it is measured against a negatively weighted exposure "E" rating to provide an overall in market brand performance score, referred to as the Attraction score and ranking (Step 608).

The four example influence factors and corresponding example API calls are provided below.

Brand Interest Influence Factor: Search—Domain Authority (realtime)
  $I_1$: Search (Score out of 100)
  <SELECT Data Field: Domain Authority; FROM Data Source: Influence-API-1 WHERE Parameter 1: Domain_Name>
Brand Presence Influence Factor: Keyword—Keyword Difficulty (realtime)
  I2: Keyword (Score out of 100)
  <SELECT Data Field: Keyword Difficulty; FROM Data Source: Influence-API-2; WHERE Parameter 2: Brand_Name; Parameter 5: Country>
Brand Relevance Influence Factor: Website—Site Visits by Source of Traffic (trailing 12 months)
  I3: Website (Score out of 100)
  <SELECT Data Field: Rank(Site Visits) by Brand_Category_Peers; FROM Data Source: Influence-API-3; WHERE Parameter 1: Domain_Name; Parameter 5: Country; Parameter 6: Date_Range>
Brand Advocacy Influence Factor: Social—Positive, Neutral, Negative Sentiment by Source (trailing 12 months)
  I4: Social (Score ranging from +100 to −100)
  <SELECT Data Field: (Sum(Positive Sentiment)—Sum (Negative Sentiment)×100/n)×(Engagement/Brand_Category_Peers_Engagement/Brand_Category_Peers_Engagement); FROM Data Source: Influence-API-4; WHERE Parameter 2: Brand_Name; Parameter 6: Date_Range>

Once the influence factor scores are extracted for the brand and the set of competitor brands within the category being analyzed, each influence factor is weighted and then the weighted Influence factor scores are combined to form a total Influence score $\overline{I_w}$ for each brand, i.e., the specific brand and each brand in the set of competitor brands, using the following example formula.

$$\overline{I_w} = \frac{\sum_{i=1}^{n}(I_i * w_i)}{\sum_{i=1}^{n} w_i} \quad (1)$$

where $I_i$=Influence factor score; $w_i$=Weighting factor for the corresponding influence factor; and n=the total number of Influence factors (Steps 602, 604, & 606).

The weighting factor $w_i$ for each influence factor represents a percentage of the traffic share of influence factor for a particular brand category. Although the methodology and weighting of each separate influence source may vary by category as it applies to the master algorithms the sum of the weighting factors for all the influence factors equals 100 percent.

Example weighting factor API calls for influence factors are provided below.

Interest Influence Factor—Search Weighting
  $W_1$: Search Weighting
  <SELECT Data Field: % Traffic_Share(OrganicSearch)/2; FROM Data Source: Influence-API-3; WHERE Parameter 3: Brand_Category; Parameter 6: Date_Range>
Presence Influence Factor—Keyword Weighting
  $W_2$: Keyword Weighting
  <SELECT Data Field: % Traffic_Share(OrganicSearch)/2; FROM Data Source: API-3; WHERE Parameter 3: Brand_Category; Parameter 6: Date_Range>
Relevance Influence Factor—Website Weighting
  $W_3$: Website Weighting
  <SELECT Data Field: % Traffic_Share(Direct+Referral); FROM Data Source: API-3; WHERE Parameter 3: Brand_Category; Parameter 6: Date_Range>
Advocacy Influence Factor—Social Weighting
  $W_4$: Social Weighting
  <SELECT Data Field: % Traffic_Share(Social); FROM Data Source: API-3; WHERE Parameter 3: Brand_Category; Parameter 6: Date_Range>

In order to determine the Brand's Attraction Score, the brand's exposure or dollar amount spent, in comparison to the competitor brand set, is determined. Exposure for brand spending can be extracted from external data and/or sources, such as Neilson media measurement data, using API calls. The extracted data is then transformed and normalized into a total Exposure value for each brand (Step 608). The total Exposure may further be filtered by location and time frame.

Example Exposure data sources include:
  Exposure-DataSource-1: Offline_Exposure by brand, country, date (monthly, quarterly, annually)
  Exposure-DataSource-2: Online_Exposure by brand, country, date (real time)
Example transformations include:
  Total adjusted media exposure ($E_n$) for earned media of net positive sentiment mentions using the following formulation:

$$En = (1-M_n s_n)E*n$$

where E*n=total unadjusted dollars spent by brand n on exposure.

The number of mentions on social media in the last month: $m_1, m_2, \ldots, m_i$,
The percentage of positive sentiment for the month: $s^P_1, s^P_2, \ldots, s^P_i$,
The percentage of negative sentiment for the month: $s^N_1, s^N_2, \ldots, s^N_i$, Define $M_n = m_i/(m_1+m_2+\ldots m_i)$, and $$s_n = s^P_n - s^N_n$$

The series of influence (I) and exposure (E) weighted formulations are provided to a master algorithm to determine the net Attraction scores and rankings using the following formulation (Step 610).

$$\frac{I_E - \overline{I_w}}{n_v} = A_{score} \quad (2)$$

where $A_{score}$=Attraction Score, $I_E$=Expected Influence (exposure based), $\bar{I}_w$=actual influence (e.g., weight average), and $n_v$=sample size (e.g., vertical). The $A_{score}$ has a range from −1 to +1 and may be for reporting purposes converted into a $A_{score}$ Ranking from 0 to 100, wherein $A_{score}$ Ranking=$((1+A_{score})/2*100)$.

The Expected Influence, $I_E$, is calculated based on the brand Exposure using the following formulations.

$$I_E = \frac{n}{2} - \left(\theta_n \cdot \frac{n}{2}\right) \quad (3)$$

$$\theta_n = \frac{E_n - \tilde{E}}{E_{max} - \tilde{E}} \quad (4)$$

where n=the number of brands in the competitor set, $E_n$=total dollars spent by brand n; $E_{max}$=max$\{E_1, E_2, \ldots E_n\}$, and $\tilde{E}$=median$\{E_1, E_2, \ldots E_n\}$.

Figure 3:
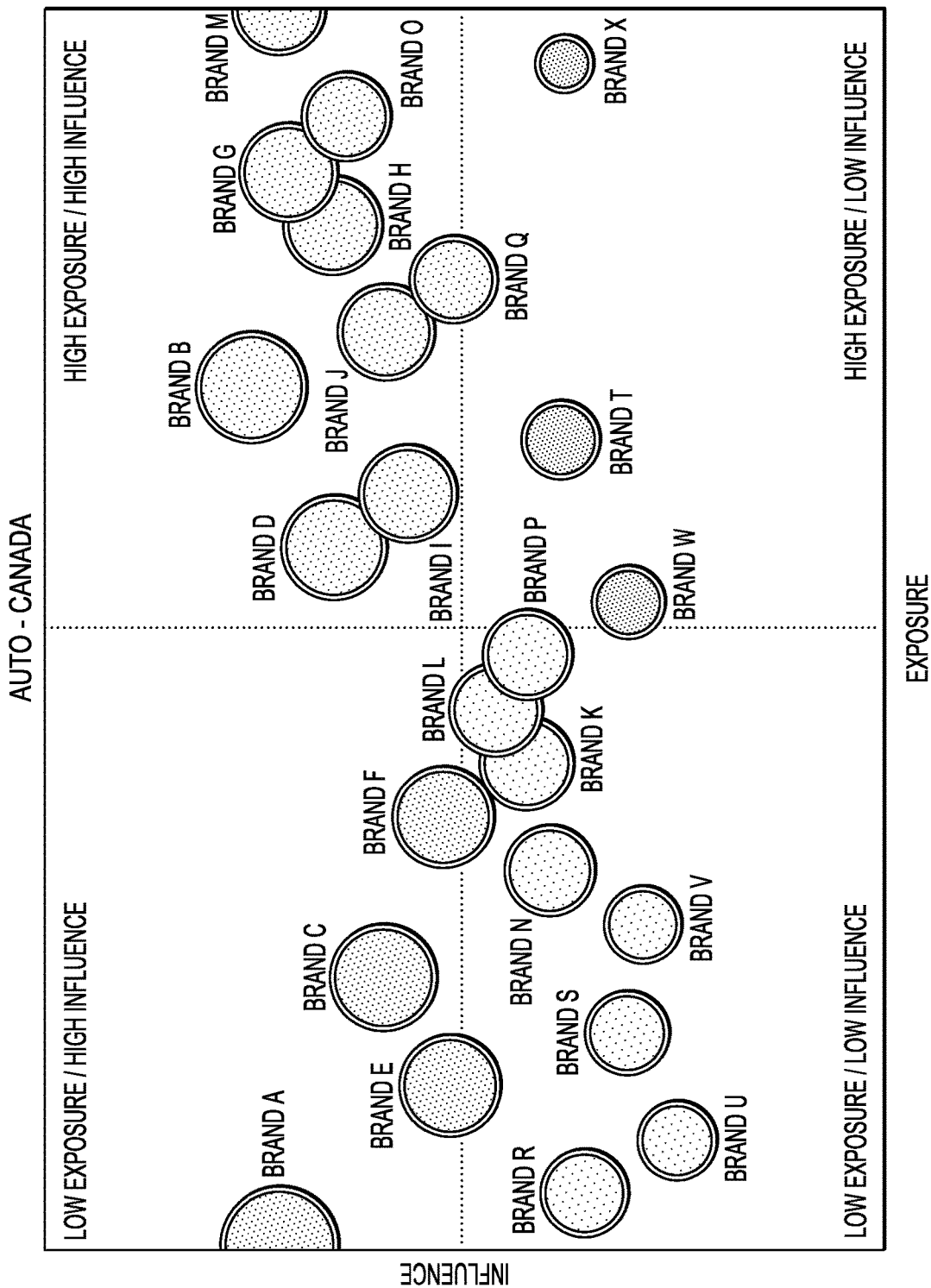
FIG. 3 illustrates an example Brand Attraction Monitor (BAM) matrix.
Figure 5A:
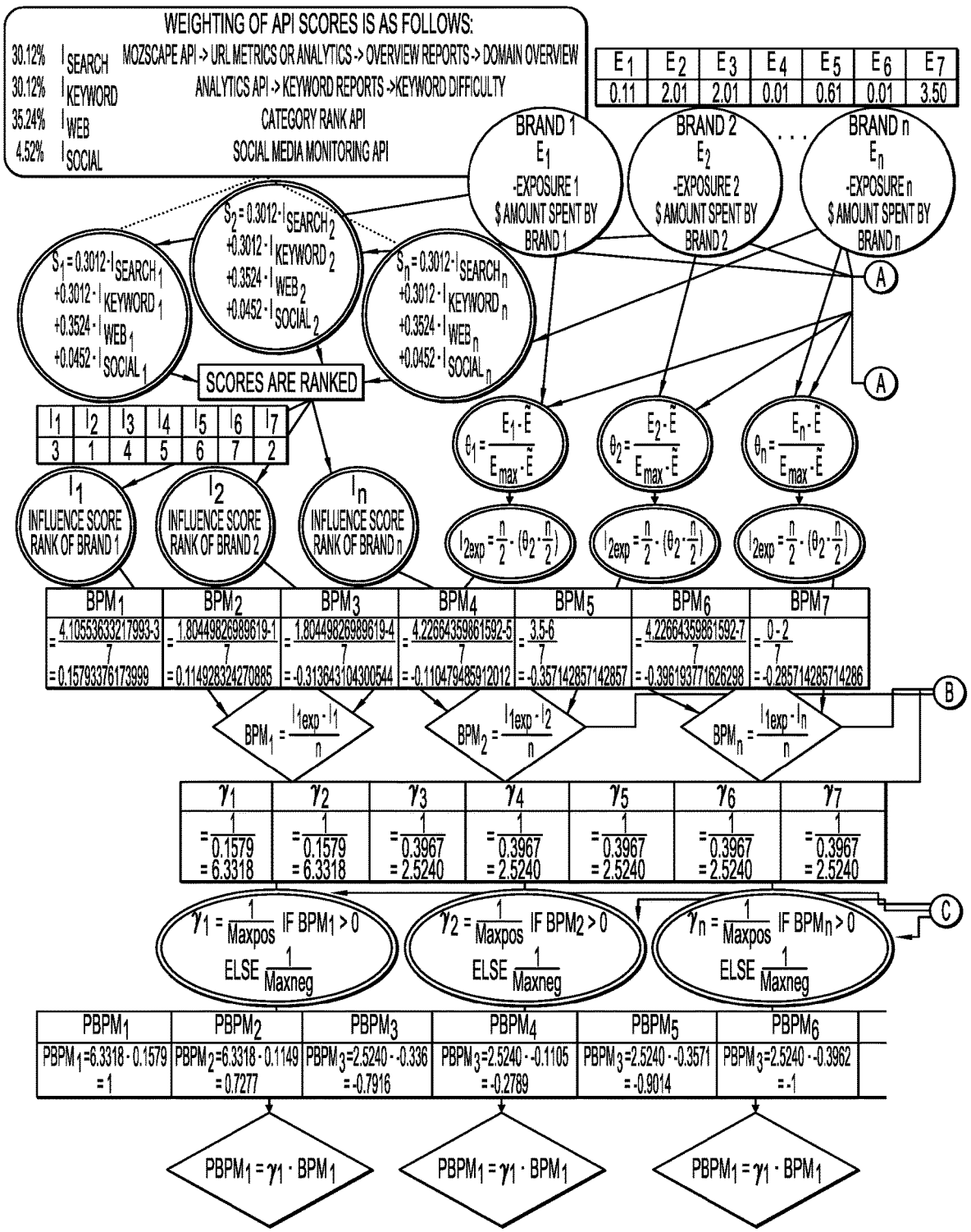
FIGS. 5A and 5B illustrate an example flow diagram and influence factor weightings.
Figure 5B:
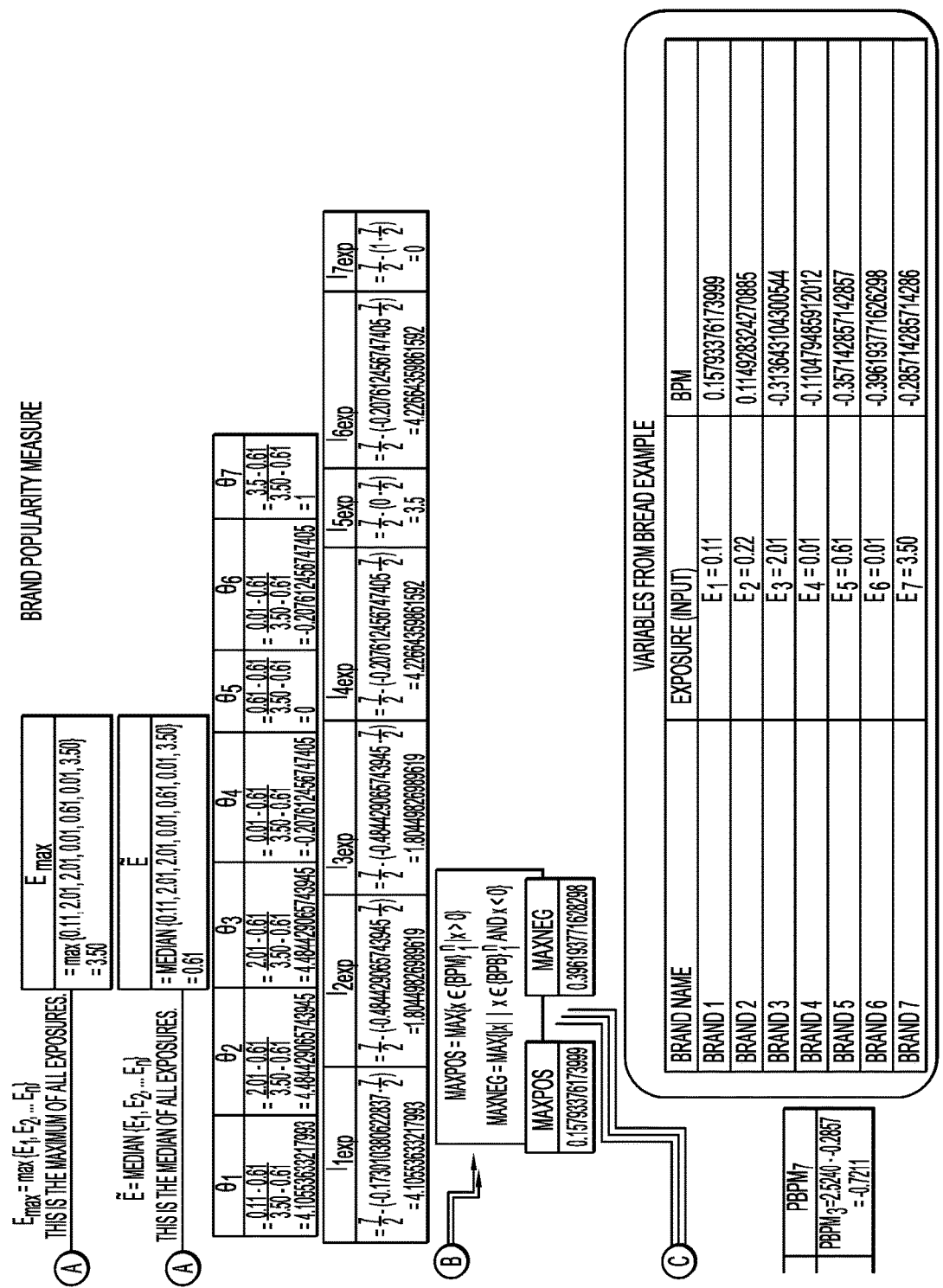

The Attraction scores for the competitor set are charted in a BAM Matrix having an x-axis of Paid Brand Exposure versus a y-axis of Brand Attraction/Influence into four quadrants:

1. Low exposure, low attraction
2. Low exposure, high attraction
3. High exposure, low attraction
4. High exposure, high attraction As shown in FIG. 3, a competitor set of brands are assigned x,y coordinates on the BAM Matrix based on their BAM Summary Brand Scores:

1. Size of Brand Marker=Attraction Score Ranking
2. X Axis Position=Total Exposure
3. Y Axis Position=Total Weighted Influence ($\bar{I}_w$)

The Attraction score is a measure of how positively a given brand's exposure is related to its influence. A higher Attraction score positioning on the chart indicates that a brand's exposure has been better converted into influence and overall market performance. Above the average line demonstrates better than expected market performance whereas below the line suggests lack of market performance against expenditures. As a result, a brand's Attraction can be declared against key competitors based on the weight of influence in relation to exposure. Exposure is based on how much a brand has spent on paid exposure, while influence is an aggregate (category specific weighting) of brand health domains that include Brand Interest (e.g., organic search ranking), Brand Presence (e.g., keyword difficulty), Brand Relevance (e.g., website visits), and Brand Advocacy (e.g., social engagement).

In addition, as shown in FIG. 4, the Attraction scores, in line with the corresponding influence factors and Exposure, can be charted for a particular category, thereby allowing a Brand to easily visualize their comparative performance among their competitor brands.

Embodiments described in this disclosure can be implemented in digital electronic circuitry, firmware, computer hardware, or in combinations thereof. Furthermore, they may be implemented as one or more computer programs, e.g., one or more modules of program instructions encoded on a non-transitory computer readable medium for execution by, or to control operation of, one or more computer processors.

Figure 6:
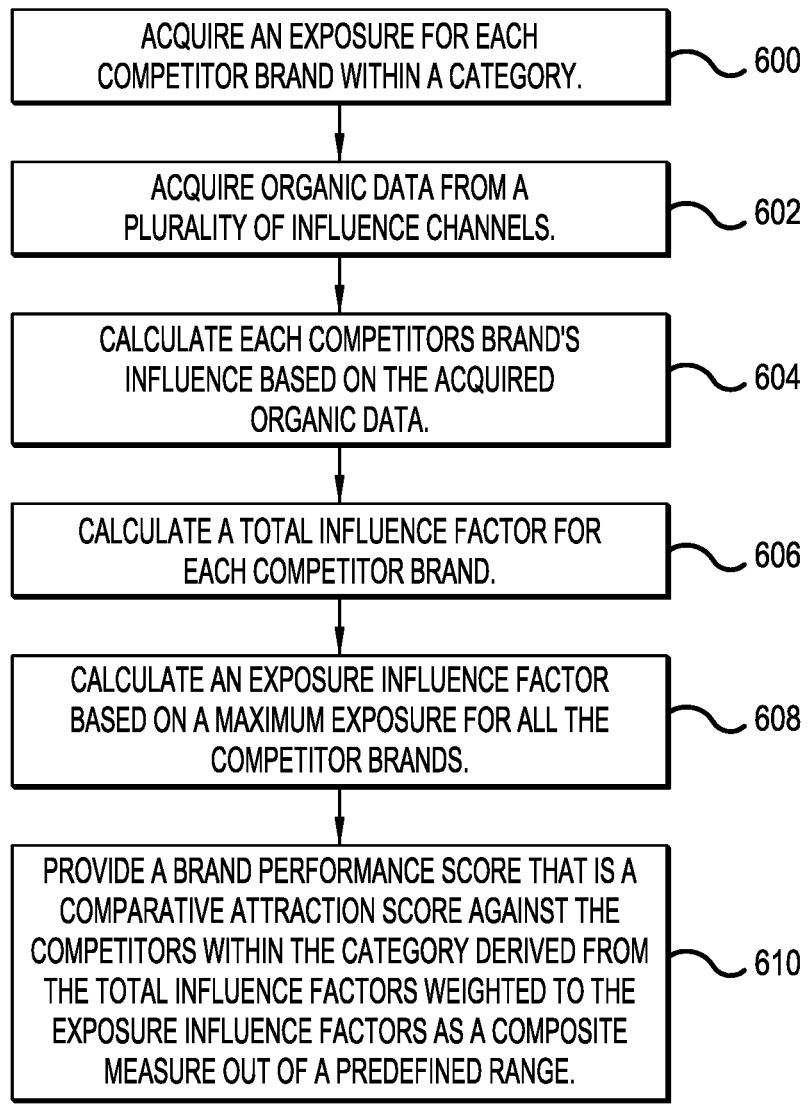
FIG. 6 is a flow diagram of an exemplary method for calculating Attraction score.

As shown in FIG. 6, according to an example embodiment, the method for providing a brand Attraction score that represents a comparison of in-market brand performance from cross-referenced data sources from various influence channels and paid media exposure channels begins with acquiring an exposure for each competitor brand within a category (step 600). Then, influence factors for each competitor brand are calculated by acquiring organic data from a plurality of influence channels (step 602); calculating each competitor brand's influence based on the acquired organic data (step 604); calculating a total influence factor for each competitor brand (step 606); and calculating an exposure influence factor based on a maximum exposure for all the competitor brands (step 608). Finally, a brand Attraction score is derived from the total influence factors weighted to the exposure influence factors as a composite measure out of a predefined range (step 610.).

The embodiments of the present disclosure provide advantages for conventional systems. For example, the conventional systems do not account for paid media expenditures, they don't acquire data from multiple influence channels, and conventional summary scores don't account for both relative ranking and exposure factor. In addition, the conventional system does not provide a visual matrix representation of comparable brand performance scores, they only provide one dimensional scale-based visual representations.

Figure 7:
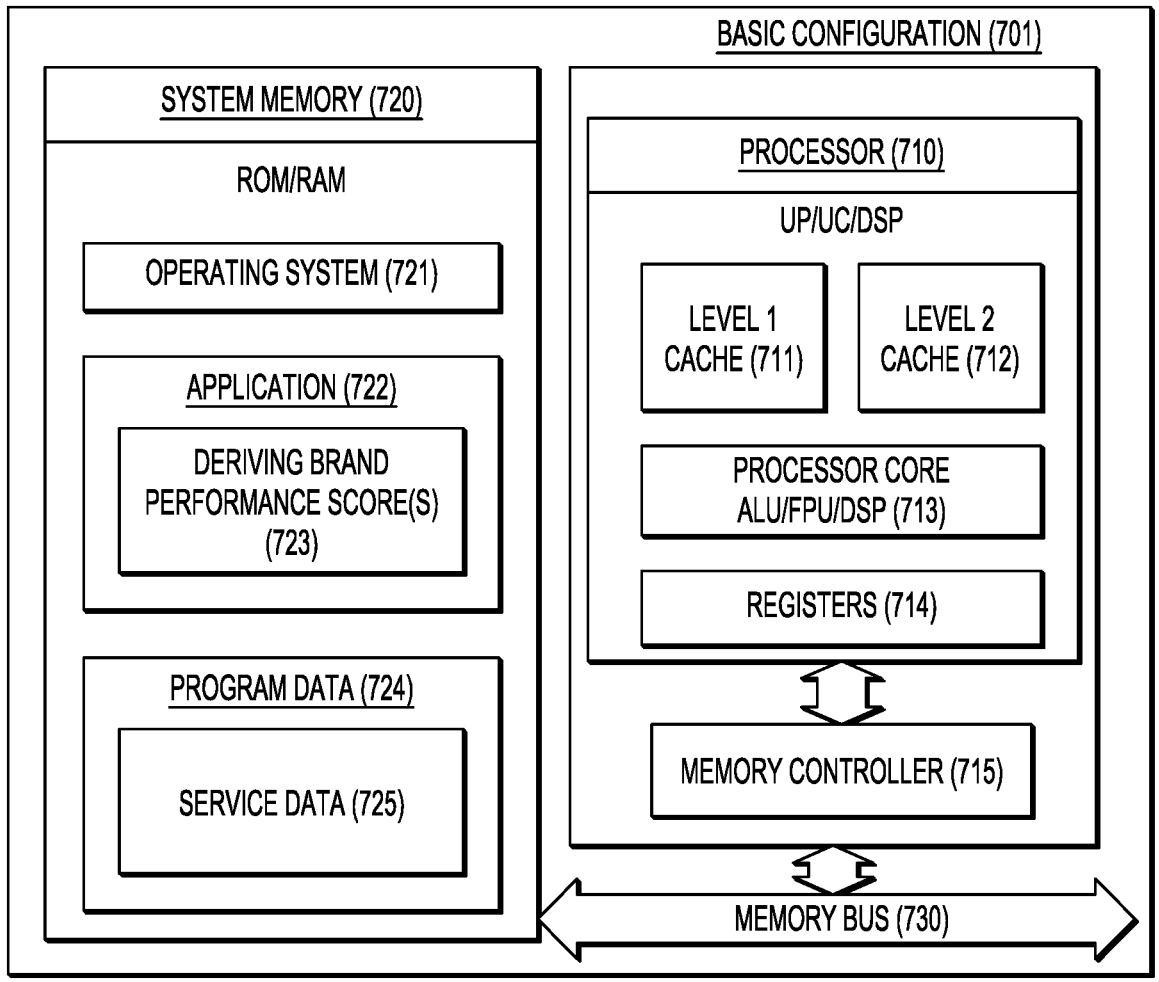
FIG. 7 is a block diagram illustrating an exemplary computing device.

FIG. 7 is a block diagram illustrating an example computing device 700, that is arranged for providing a brand Attraction score that represents a comparison of in market brand performance from cross referenced data sources from various influence channels and paid media exposure channels in accordance with the present disclosure. In a very basic configuration 701, computing device 700 typically includes one or more processors 710 and system memory 720. A memory bus 730 can be used for communicating between the processor 710 and the system memory 720.

Depending on the desired configuration, processor 710 can be of any type including but not limited to a microprocessor (µP), a microcontroller (µC), a digital signal processor (DSP), or any combination thereof. Processor 710 can include one or more levels of caching, such as a level one cache 711 and a level two cache 712, a processor core 713, and registers 714. The processor core 713 can include an arithmetic logic unit (ALU), a floating point unit (FPU), a digital signal processing core (DSP Core), or any combination thereof. A memory controller 715 can also be used with the processor 710, or in some implementations the memory controller 715 can be an internal part of the processor 710.

Depending on the desired configuration, the system memory 720 can be of any type including but not limited to volatile memory (such as RAM), non-volatile memory (such as ROM, flash memory, etc.) or any combination thereof. System memory 720 typically includes an operating system 721, one or more applications 722, and program data 724. This described basic configuration is illustrated in FIG. 7 by those components within dashed line 401.

Computing device 700 can have additional features or functionality, and additional interfaces to facilitate communications between the basic configuration 701 and any required devices and interfaces. System memory 720, removable storage 751 and non-removable storage 752 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 400. Any such computer storage media can be part of device 700.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method of evaluating brand performance employing at least one data processor having processor-implemented instructions, the method comprising:
   a) providing or determining a set of input parameters, wherein the set of input parameters includes a brand category and a plurality of brand names that compete with one another in the brand category;
   b) for a plurality of predetermined influence factors and each given brand name in the plurality of brand names, automatically accessing a plurality of data sources corresponding to the plurality of predetermined influence factors and obtaining influence source data for the given brand name from the plurality of data sources, wherein the plurality of predetermined influence factors relates to brand influence across different channels, and wherein the automatically accessing the plurality of data sources uses application programming interfaces corresponding to the plurality of data sources;
   c) for each given influence factor in the plurality of predetermined influence factors and each given brand name in the plurality of brand names, calculating an influence factor score for the given influence factor and the given brand name based on the influence source data of b) for the given influence factor and the given brand name;
   d) for each given brand name in the plurality of brand names, calculating an influence score for the given brand name based on the influence factor scores of c) for the given brand name and a set of corresponding weighting factors;
   e) for each given brand name in the plurality of brand names, automatically accessing at least one additional data source and obtaining exposure source data for the given brand name from the at least one additional data source, wherein the exposure source data for the given brand name reflects monetary expenditures associated with the given brand name, and wherein the automatically accessing the at least one additional data source uses an application programming interface corresponding to the at least one additional data source which is based on parameters associated with a given brand name;
   f) for each given brand name in the plurality of brand names, calculating an exposure score for the given brand name based on the exposure source data of e) for the given brand name;
   g) for each given brand name in the plurality of brand names, calculating a brand score for the given brand name, wherein the brand score for the given brand name is based on the influence score of d) for the given brand name and the exposure score of f) for the given brand name; and
   h) presenting for display a visual representation of the brand scores as calculated in g) for the plurality of brand names, wherein the visual representation includes a plurality of visual elements corresponding to the plurality of brand names plotted in a two-dimensional exposure-influence coordinate system, wherein each visual element is displayed at a position corresponding to the exposure score of f) for the corresponding brand name and the influence score of d) for the corresponding brand name, and wherein size of each visual element is based on the brand score of g) for the corresponding brand name.

2. A method according to claim 1, wherein:
the operations of a) to h) are performed by the processor-implemented instructions.

3. A method according to claim 1, wherein:
the set of weighting factors of d) for a given brand name corresponds to the plurality of predetermined influence factors, and the set of weighting factors for the given brand name is based on the brand category of a) for the given brand name.

4. A method according to claim 1, wherein:
the plurality of predetermined influence factors includes a brand interest influence factor; and
the influence factor scores calculated in c) for the given brand name include a brand interest influence factor score which is a measure pertaining to number of domains related to the given brand name.

5. A method according to claim 1, wherein:
the plurality of predetermined influence factors includes a brand presence influence factor; and
the influence factor scores calculated in c) for the given brand name include a brand presence influence factor score which is a measure pertaining to keywords related to the given brand name.

6. A method according to claim 1, wherein:
the plurality of predetermined influence factors includes a brand relevance influence factor; and
the influence factor scores calculated in c) for the given brand name include a brand relevance influence factor score which is a measure pertaining to website visits related to the given brand name.

7. A method according to claim 1, wherein:
the plurality of predetermined influence factors includes a brand advocacy influence factor; and
the influence factor scores calculated in c) for the given brand name include a brand advocacy influence factor score which is a measure pertaining to sentiment of mentions related to the given brand name.

8. A method according to claim 1, wherein:
at least some of the influence source data of b) is based on a specific geographical location or time frame.

9. A method according to claim 1, wherein:
the exposure source data of e) is based on filtering exposure data by geographical location and time frame.

10. A method according to claim 1, further comprising:
determining at least one social media metric for each given brand name in the plurality of brand names, wherein the exposure score for the given brand name in f) is calculated based on the at least one social media metric for the given brand name.

11. A method according to claim 10, wherein:
the at least one social media metric for the given brand name is selected from the group including number of mentions in a month for a number of months, percentage of positive sentiment in a month for a number of months, and percentage of negative sentiment in a month for a number of months.

12. A method according to claim 1, wherein:

the influence score for the given brand name is calculated in d) by weighting the plurality of influence factor scores calculated in c) for the given brand name using the following formula $$\overline{I_w} = \frac{\sum_{i=1}^{n}(I_i * w_i)}{\sum_{i=1}^{n} w_i}$$

where $\overline{I_w}$ is the influence score for the given brand name,
  $I_i$ is the influence factor score for a respective influence factor i=1 . . . n, and
  $w_i$ is the weighting factor corresponding to the respective influence factor i=1 . . . n.

13. A method according to claim 12, wherein:

the weighting factor $w_i$ is based on a percentage of the traffic share of influence for a particular brand category.

14. A method according to claim 1, wherein:

the exposure score for the given brand name is calculated in f) using the following formula $$\theta_n = \frac{E_n - \tilde{E}}{E_{max} - \tilde{E}}$$

where $E_n$ is based on monetary expenditures associated with the given brand name,
  $E_{max}$ is based on maximum monetary expenditures associated with the plurality of brand names, and
  $\tilde{E}$ is based on median monetary expenditures associated with the plurality of brand names.

15. A method according to claim 14, wherein:

$E_n$ is further based on at least one social media metric for the given brand name.

16. A method according to claim 15, wherein:

the at least one social media metric for the given brand name is selected from the group including number of mentions in a month for a number of months, percentage of positive sentiment in a month for a number of months, and percentage of negative sentiment in a month for a number of months.

17. A method according to claim 1, wherein:
the brand score for the given brand name is calculated in g) using the following formula $$\frac{I_E - \overline{I_w}}{n_v} = A_{score}$$

where $A_{score}$ is the brand score for the given brand name,
  $\overline{I_w}$ is the influence score calculated in d) for the given brand name,
  $I_E$ is an expected influence score for the given brand name based on the exposure score calculated in f) for the given brand name, and
  $n_v$ is a sample size.

18. A method accord to claim 17, wherein:
the expected influence score for the given brand name is calculated according to the following formula $$I_E = \frac{N}{2} - \left(\theta_n * \frac{N}{2}\right),$$

where N is the number of brand names in the plurality of brand names, and
  $\theta_n$ is the exposure score calculated in f) for the given brand name.

19. A method according to claim 1, wherein:
the brand score for the given brand name as calculated in g) has a range from −1 to +1.

20. A method according to claim 1, further comprising:
ranking the plurality of brand names based on the brand scores as calculated in g) for the plurality of brand names.

21. A method according to claim 20, wherein:
the ranking of the plurality of brand names involves converting the brand scores as calculated in g) into ranking scores in the range of 0 to 100.

22. A method according to claim 1, wherein:
the two-dimensional exposure-influence coordinate system comprises four quadrants including a first quadrant corresponding to low exposure and low attraction, a second quadrant corresponding to low exposure and high attraction, a third quadrant corresponding to high exposure and low attraction, and a fourth quadrant corresponding to high exposure and high attraction.

23. A method according to claim 1, wherein:
the plurality of data sources corresponding to the plurality of influence factors of b) pertain to different influence channels of a given brand name.

24. A method according to claim 1, wherein:
the at least one additional data source of e) pertains to at least one media exposure channel of a given brand name.

25. A data processing system comprising at least one processor and at least one storage device storing instructions that are executable on the at least one processor to cause the at least one processor to perform the method of claim 1.

* * * * *